United States Patent [19]

Inoue

[11] 4,201,777
[45] May 6, 1980

[54] CARBONACEOUS BODIES

[75] Inventor: Kiyoshi Inoue, Tokyo, Japan

[73] Assignee: Inoue-Japax Research Incorporated, Yokohama, Japan

[21] Appl. No.: 931,909

[22] Filed: Aug. 8, 1978

[30] Foreign Application Priority Data

Aug. 11, 1977 [JP] Japan .................................. 52/95527

[51] Int. Cl.² ...................... C10M 7/04; C01B 31/04
[52] U.S. Cl. .................................. 428/212; 428/408; 428/409; 423/448; 252/12; 252/29
[58] Field of Search ....................... 428/408, 409, 212; 423/448; 252/12, 29

[56] References Cited

U.S. PATENT DOCUMENTS

| | | | |
|---|---|---|---|
| 2,911,319 | 11/1959 | Peter | 428/408 |
| 2,922,722 | 1/1960 | Hutcheon | 428/408 |
| 3,720,499 | 3/1973 | Hirayama | 428/408 |
| 3,853,586 | 12/1974 | Olcott | 428/408 |
| 3,922,412 | 11/1975 | Yoshikawa | 428/408 |
| 3,980,105 | 9/1976 | Myskowski | 428/408 |
| 4,005,163 | 1/1977 | Bokros | 252/12 |
| 4,015,068 | 3/1977 | Vohler | 423/448 |
| 4,070,514 | 1/1978 | Eatherly | 428/408 |

OTHER PUBLICATIONS

R. E. Franklin, "Crystal Growth in Graphitizing and Non-Graphitizing Carbons", *Proc. Roy. Soc.*, 209A, pp. 196-218 (1951).
"A-8 Carbon and Graphite Articles", Kinbara Shuppan (1967), Edited by Takei and Kawashima, pp. 11 and 12.

*Primary Examiner*—Ellis P. Robinson
*Attorney, Agent, or Firm*—Karl F. Ross

[57] ABSTRACT

A unitary carbonaceous body consists of turbostratic carbon formed with a superficial graphitized portion in situ, preferably by passing a high-amperage electric current through this portion.

8 Claims, 3 Drawing Figures

CARBONACEOUS BODIES

FIELD OF THE INVENTION

The present invention relates to carbonaceous bodies and, more particularly, to a mechanical carbon material suitable to form bearings, dies, molds and electric conductors or brushes and the like parts where resistance to mechanical and thermal stresses is important.

BACKGROUND OF THE INVENTION

These parts have been made heretofore commonly from carbon which proves to have satisfactory mechanical strength in use. Carbon bodies which have been employed are, however, found to be defective in lubrication properties and hence are desired to be improved.

OBJECT OF THE INVENTION

Accordingly, it is the object of the present invention to provide an improved carbonaceous body which is not only mechanically strong but is excellent also in lubrication and other properties including wear resistance and separability from mating surfaces in use.

SUMMARY OF THE INVENTION

In accordance with the invention, there is provided a carbonaceous body has at least one selected superficial portion which is more graphitized in situ than the remainder that is basically nongraphitized carbon, said superficial portion serving to form a frictional, bearing and/or die or molding surface. Preferably, there are provided a plurality of such superficial portions serving to form such surfaces of a base body which is substantially of non-graphitized or turbostratic carbon. The more graphitized portion or portions should, in accordance with a more specific aspect of the invention, have a p value in the range less than 0.6 and practically between 0.3 and 0.6 determined with X-ray diffraction analysis and defined by the Franklin's expression: $d = 3.440 - 0.086(1-p^2)$ where d is the means stratic spacing of turbostratic structure obtained from an X-ray diffraction diagram. The terms "p value" and "Franklin's expression" are well known in the carbon art and described, for example, in Takei and Kawashima: "Atarashii Kogyo Zairyo no Kagaku" A-8 "Tanso to Kokuen Seihin (Carbon & Graphite Articles)", Kinbara Shuppan (1967), and in R. E. Franklin: Proc. Roy, Soc., 209A, 196 (1951).

SUMMARY OF THE INVENTION

The invention will now be described with reference to the accompanying drawing in which.

SPECIFIC DESCRIPTION

Figure 1:
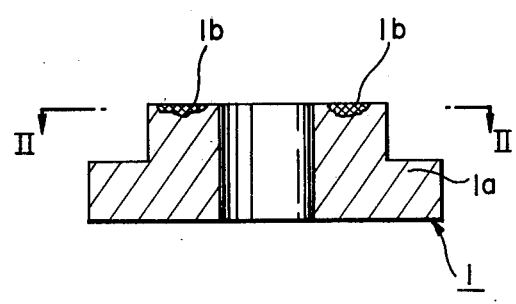
FIG. 1 is a sectional view in elevation illustrating a thrust bearing embodying the invention.
Figure 2:
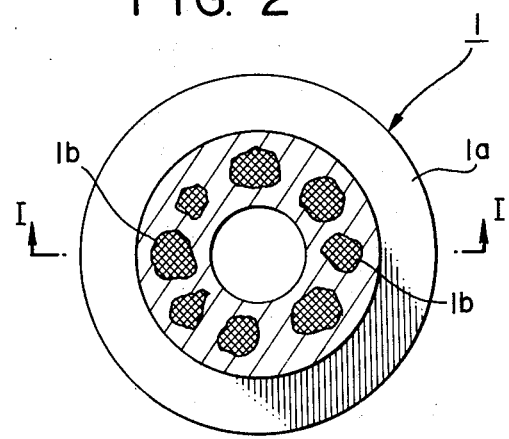
FIG. 2 is a cross-sectional view as taken along the line II—II and viewed in the direction of the arrow in FIG. 1.

The thrust bearing 1 shown in FIGS. 1 and 2 comprises a carbonaceous body prepared in accordance with the invention, the body having a non-graphitized base carbon body 1a and a plurality of superficial portions 1b which are graphitized advantageously by an electrical heating process as will be described in connection with FIG. 3.

Figure 3:
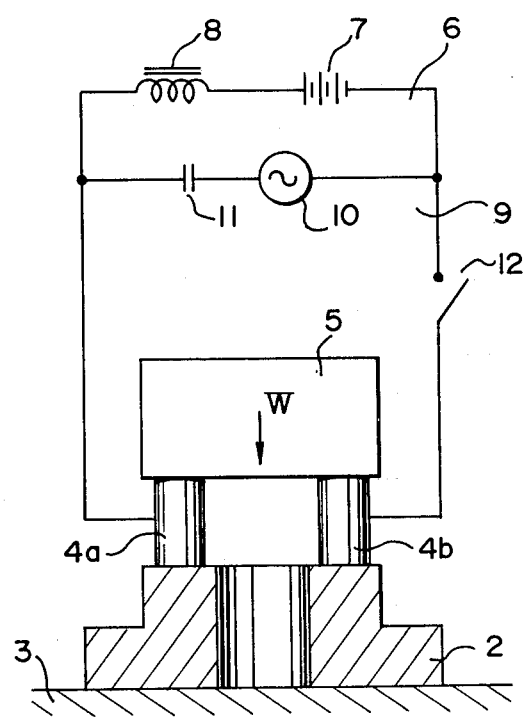
FIG. 3 is a diagrammatic view illustrating an apparatus for preparing a carbonaceous composite body according to the invention.

With reference to FIG. 3, a homogeneous carbon body 2 comprises a sintered mass of carbon from which the composite body 1 of the invention is prepared with an arrangement shown. Thus, the sintered ungraphitized or carbon body 2 is held on a base 3 and has a pair of cylindrical graphite electrodes 4a, 4b urged thereon by an insulating head 5 under pressure W. A power supply for energizing the electrodes 4 is shown comprising, in a preferred embodiment, a direct-current branch 6 consisting of a DC source 7 and an AC-blocking reactor or choke 8 and an alternating-current branch 9 consisting of an AC source 10 and a DC-blocking capacitor 11, the two electrical branches being connected in parallel with each other across the electrodes 4a and 4b via a switch 12.

Initially, the carbonaceous body consists entirely of a non-graphitized carbon material 1a which may be made in accordance with usual practice by a known powder metallurgy or sintering process from a usual carbon precursor derived from coal, petroleum or pitch-coke system containing in part natural or man-made graphite powder or soot system with coal tar, pitch and/or heat-settable resin added therein as a binder. Such precursor mixture may be compacted by means of molding processes such as compression or extrusion molding at a room temperature or an elevated temperature from 50° to 100° C. under pressure of around 1500 Kg/cm² with the compaction being followed by baking at a temperature of about 100° C. or calcination to form the carbonized body 2 of a desired shape and size as shown in FIG. 3.

Carbon of the turbostratic structure is hard and strong but inherently poor in lubricity whereas graphitized carbon excells in lubrication properties and thermal and electrical conductivities but is poor in mechanical strengths due to its laminated structure. In addition, in order to achieve graphitization, a high-temperature heat-treatment or secondary baking after the calcination or primary baking of a carbonaceous substance is required involving an elevated temperature as high as 2000° to 3000° C. and a long period of treatment time, this entailing an extremely large amount of energy. This, coupled with shortened life of dies or molds used, tends to render a product undesirably expensive and make a volume productive thereof impractical or uneconomical.

In accordance with the present invention, problems of conventional carbon-made mechanical articles are overcome by initially preparing a carbonaceous body consisting substantially entirely of carbon by means of low-temperature molding and calcination and subsequently graphitizing preferentially preselected superficial portions of the carbon body by localized heat-treatment, advantageously by a process involving an arrangement as shown in FIG. 3. Thus the unitary or one-piece carbon body has the graphite superficial portions formed in situ on the body.

In the arrangement of FIG. 3, a sintered carbon mass 2 is positioned on the base 3 of a press not shown, being sandwiched between the upper surface of the base 3 and the lower ends of a a pair of electrodes 4a, 4b attached to the electrode holder or head 5 under pressure W exerted by such press. The lower ends of the compressing electrodes 4a, 4b are positioned in contact with the mass 2 so as to be diametrically symmetrical with respect to the center axis thereof.

In operation, upon closure of the switch 12, a high-amperage electric current primarily from the main DC source 7 and also containing a high-frequency component, of a frequency from 1 to 10 kHz or more but not greater than 10 MHZ, from the AC source 10 is passed through the mass 2 between the electrodes 4a and 4b so that electrical heating is effected among particles constituting the mass 2. Superficial layers of the mass 2 in the vicinity of the interfaces between the mass 2 and the electrodes 4a, and 4b are thus selectively graphitized or at least more graphitized than the remainder so that the portions 1b have a p value (referred to previously) of less than 0.6 or practically between 0.3 and 0.6 while the remainder portions 1a remain to have a p value in excess of 0.6 or 0.7. By repeating this cycle while altering the contact position of the electrodes 4a, 4b with the mass 2 successively, a plurality of locally graphitized zones 1b are formed in succession on the body 1 as illustrated in FIG. 2.

Since the carbonaceous body 1 while consisting basically of turbostratic carbon is provided with one or more effective superficial zones selectively graphitized or enhanced of graphitization, the body 1 is given excellent frictional properties possessed by graphite while retaining mechanical strength of original carbon and hence permits the satisfactory use as bearings, dies, molds, conductors and the like mechanical or contact articles.

Particular locations of graphitization as well as area, depth and the degree of graphitization thereof on the base carbon body may be variably achieved by the corresponding configuration of the electrodes 4a, 4b, the current magnitude (current density) of the output of the power supply, the relative proportion of the AC component and DC component of the power supply and other operating parameters.

EXAMPLE

A carbonaceous precursor contains as its principal component 7 parts thermal petroleum black (soot) plus 3 parts pitch coke and as the binder 10 % by weight high-carbon pitch. A mass of the precurser is compacted calcinated by electrical sintering with an electric power of 8 w.hr/g, a pressure of 450 Kg/cm$^2$ and a sintering period of 90 seconds to form a sample B having a turbostratic carbon structure. A compacted body constituting the sample B is then locally graphitized by an arrangement basically shown in FIG. 3 with an electric power of 15 w.hr/g (containing 7 parts DC component and 3 parts 3 KHz AC component), a pressure 350 Kg/cm$^2$ and a treatment period of 100 seconds to form a sample C as shown in FIG. 2 of which graphitized zones (1b) have a p value of 0.33. Physical properties of sample C are examined and compared with those of sample B examined as well as those of sample A which represents a typical graphite body, as shown in Table I. The first, calcination step of the samples is conveniently conducted with the same arrangement as in the local graphitization step.

TABLE I

| | Sample A | Sample B | Sample C (graphitized zones) |
|---|---|---|---|
| Density (g/cm$^3$) | 1.84 | 1.80 | 1.80 |
| Bending strength (Kg/cm$^2$) | 450 | 670 | 670 |
| Compression strength (Kg/cm$^2$) | 1000 | 2100 | 2100 |
| Hardness (Hs) | 60 | 79 | 79 (50) |
| P-value | 0.35 | 0.75 | (0.33) |

Abrasion tests (dry-type) are carried out of sample A, B and C with a mating surface of FC25 material (cast iron) moving at a relative rate of displacement of 8 meters/seconds and with a contact pressure of 5 Kg/cm$^2$. Test results are shown in Table II.

TABLE II

| Testing temp. (°C.) | Sample A | | Sample B | | Sample C | |
|---|---|---|---|---|---|---|
| | μ | Δm | μ | Δm | μ | Δm |
| 50 | 0.17 | 1.4 | 0.24 | 5 | 0.18 | 1.0 |
| 150 | 0.29 | 130 | 0.35 | 8 | 0.30 | 15.0 |
| 250 | 0.13 | 44 | 0.51 | 11 | 0.17 | 12.6 |
| 300 | 0.14 | 22 | 0.46 | 10 | 0.15 | 13.5 |

μ: friction coefficient
Δm: wear ($\times 10^{-7}$ cm$^3$/Kg·m)

It is seen that a body when purely of graphite exhibits a low friction coefficient but suffers extreme wear in a temperature range of 150° to 250° C. On the other hand, a non-graphitized turbostratic carbon body suffers a relatively low wear but is found, due to a large friction coefficient it exhibits, to require a great amount of torque. In contrast to these, however, bodies according to the invention are shown to be ideally low both in friction coefficient and wear, thus quite satisfactory as a mechanical bearing material.

There is thus provided, in accordance with the invention, an improved carbonaceous body which is excellent in mechanical strength, wear resistance and lubricity, and hence highly suitable as mechanical surface bearing components and which permits a volume production at a reduced cost.

I claim:

1. A carbonaceous body formed unitarily of carbon, and having at least one selected superficial portion graphitized in situ and a p value not greater than 0.6 determined by X-ray diffraction and defined in an expression: $d = 3.440 - 0.086(1 - P^2)$ where d is the mean stratic spacing of turbostratic carbon structure obtained from an X-ray diffraction diagram, said portion only constituting part of the body, the part of said body other than said selected superficial portion being composed of substantially nongraphitized or turbostratic carbon.

2. The carbonaceous body according to claim 1 wherein said p value in said at least one selected portion is the range between 0.3 and 0.6.

3. The carbonaceous body according to claim 1 wherein said p value in said part of the body other than said selected portion is in excess of 0.7.

4. The carbonaceous body according to claim 1 wherein a plurality of such superficial portions are provided.

5. The carbonaceous body according to claim 1, claim 2 or claim 3, wherein said at least one selected portion is selectively graphitized by preparing a turbostratic carbon body; and passing a high-amperage electric current at least through said selected superficial portion of said body to preferentially effect a graphitization thereof.

6. The carbonaceous body according to claim 5, wherein said electric current comprises a direct current on which is superimposed a high-frequency alternating current.

7. The carbonaceous body according to claim 6, wherein said high-frequency alternating current has a frequency in the range between 1 KHz and 10 MHz.

8. A method of making the body of claim 3 which comprises passing a high-amperage electric current through a selected portion of a mass of turbostratic carbon forming the body to graphitize said portion selectively in situ.

* * * * *